Figure 1:
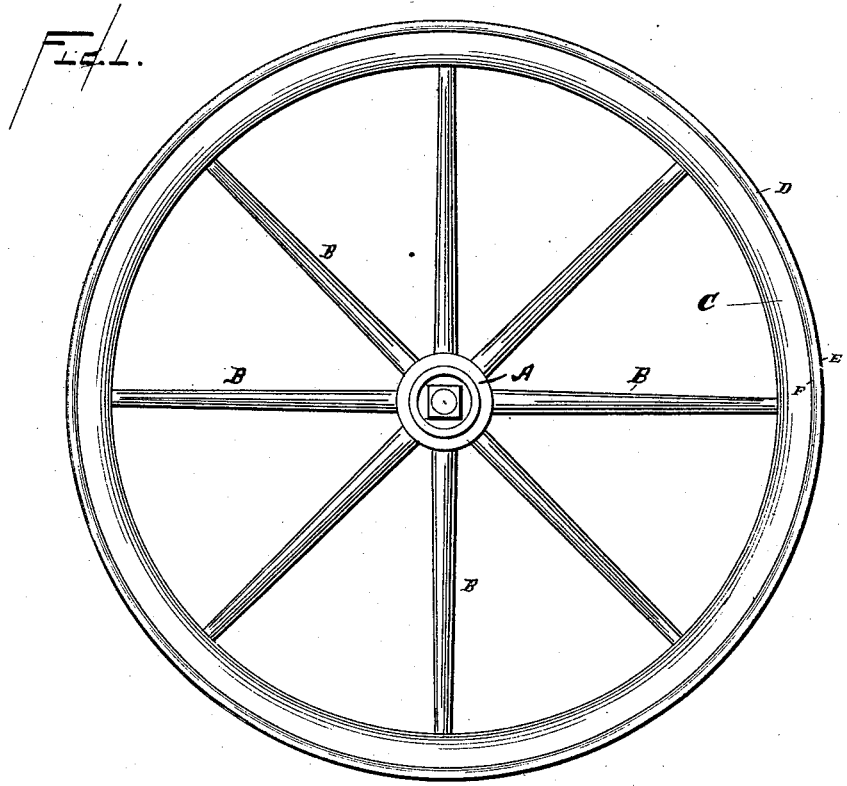

(No Model.)

J. G. HESS.
TIRE.

No. 352,187. Patented Nov. 9, 1886.

Witnesses
Geo. Thorpe.
John H. Diggers

Inventor
John G. Hess
By his Attorneys

United States Patent Office.

JOHN G. HESS, OF EMMITTSBURG, MARYLAND.

TIRE.

SPECIFICATION forming part of Letters Patent No. 352,187, dated November 9, 1886.

Application filed September 8, 1886. Serial No. 213,029. (No model.)

*To all whom it may concern:*

Be it known that I, JOHN G. HESS, a citizen of the United States, residing at Emmittsburg, in the county of Frederick and State of Maryland, have invented a new and useful Improvement in Tires, of which the following is a specification.

My invention relates to improvements in tires for vehicle-wheels; and it consists of the peculiar construction of the same, that will be hereinafter fully described, and particularly pointed out in the claim.

The object of my invention is to provide an improved tire for vehicle-wheels with a central rib or depression, which forms two elevated sides to the tire which come in contact with the ground or other surface over which the wheel travels, and thereby increase the durability of the tire, from the fact that when the elevated side edges of the tire are worn away a solid tire is presented which has the thickness of ordinary tires as at present constructed.

It is well known to those skilled in the art to which my invention relates that the tires of vehicle-wheels of ordinary construction are more frequently worn away at the edges of the tire than at the center thereof, and thus the tire becomes worn and diminished in thickness at its edges at a very much earlier period than at its middle. I propose to provide the tire with integral ribs or flanges at its side edges, which are elevated above or projected beyond the center of the tire, so as to form a channel or groove in cross-section in the middle of the tire, so that the ribs come in contact with the ground and sustain the wear, instead of the entire periphery of the tire coming in contact with the ground and being subjected to wear and friction therewith. I am thus enabled to increase the durability of the tire to a very material degree without adding to the weight of the same to any appreciable extent, and without increasing the cost of the same, as the metal of which the tire is to be formed can first be rolled out between two rolls of the proper form in a rolling-machine and then bent into a circle of the required diameter.

A further object of my invention is to provide the tire with an interior channel which forms an air chamber or space between the tire and the fellies of the wheel, and to provide projecting flanges at opposite sides of the tire, which are tapered and curved in cross-section, so that the said flanges will not take or catch into the edges of the fellies of the wheel when fitting the tire thereto, and thereby facilitate the operation of setting the tire, and also serve to prevent lateral displacement or movement of the tire on the fellies, the ribs bearing snugly against opposite sides of the fellies, all as hereinafter more fully described.

Figure 2:
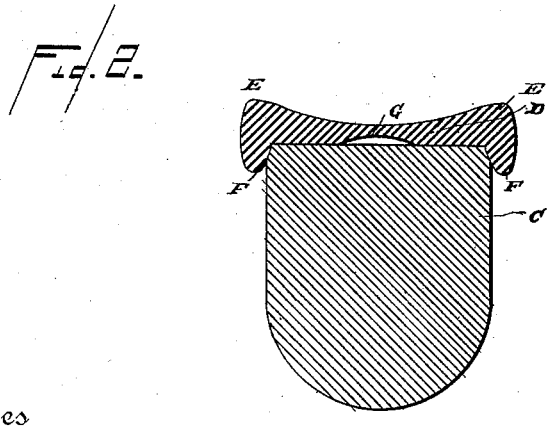

In the accompanying drawings, Figure 1 is a side elevation of a vehicle-wheel with my improved tire applied thereto. Fig. 2 is an enlarged vertical cross-sectional view through the fellies and tire on the line $x$ $x$ of Fig. 1.

Referring to the drawings, in which like letters of reference denote corresponding parts in both the figures, A designates a hub, B the spokes, and C the fellies, of a vehicle-wheel, which may be of any approved or preferred pattern.

D designates the tire of my invention, which is fitted to and shrunk upon the fellies of the wheel in the ordinary manner. This tire is provided at its side edges with elevated ribs or flanges E, which are formed integral with the same, and the said ribs are curved in cross-section toward the center or middle of the tire, so that a channel or groove is formed between the ribs and at the center of the tire. The center of the tire is of the width of ordinary tires, and the ribs or flanges E are substantially the width of the tire at its center, so that the thickness of the tire at its side edges is doubled. By this construction the durability of the tire is increased, with but a very slight increase of metal and weight as compared with the tire when it is made of uniform thickness from one edge to the other. The tire will first become worn at its side edges which come in contact with the earth until the ribs or flanges become diminished and the tire is of uniform thickness, and the wear then comes upon the periphery of the tire at all points, the middle as well as the edges thereof. The tire is further provided at its side edges with right-angled flanges F, which project beyond the lower inner face of the tire, and these flanges F are fitted on opposite sides of the fellies of the wheel to prevent lateral displacement thereof. The flanges F are curved on their sides, as shown in Fig. 2, and the said curved sides converge toward each other, the flanges being thus tapered in cross-section and curved on their sides, so that the flanges will easily and readily fit over the sides of the fellies and not catch thereon, thereby facilitating the fitting of the tire on the fellies. The tire is provided on its inner side with a groove or channel, G, which forms an air-chamber between the tire and fellies, as clearly shown.

Having thus fully described my invention, what I claim as new, and desire to secure by Letters Patent, is—

A tire for vehicle-wheels, having its center depressed on the outer side and curved gradually upward toward the side edges, so as to form raised rounded ribs or flanges E on its outer working-surface, a groove or channel, G, provided on the inner side of the tire, and flanges F, projecting from the side edges of the tire in opposite directions to the flanges E, and made tapering in cross-section in curved lines, the outer edge or point of the flanges F being rounded, for the purpose set forth.

In testimony that I claim the foregoing as my own I have hereto affixed my signature in presence of two witnesses.

JOHN G. HESS.

Witnesses:
WM. N. MOORE,
JOHN H. SIGGERS.